US012657852B1

(12) United States Patent
  Ebrahimi Afrouzi et al.

(10) Patent No.: US 12,657,852 B1
(45) **Date of Patent: *Jun. 16, 2026**

(54) VIRTUAL TAILOR

(71) Applicants: Ali Ebrahimi Afrouzi, Henderson, NV (US); Azadeh Afshar Bakooshli, Las Vegas, NV (US)

(72) Inventors: Ali Ebrahimi Afrouzi, Henderson, NV (US); Azadeh Afshar Bakooshli, Las Vegas, NV (US)

(73) Assignee: Bobsweep USA

( * ) Notice: Subject to any disclaimer, the term of this patent is extended or adjusted under 35 U.S.C. 154(b) by 0 days.

This patent is subject to a terminal disclaimer.

(21) Appl. No.: 18/484,251

(22) Filed: Oct. 10, 2023

Related U.S. Application Data

(63) Continuation of application No. 17/702,552, filed on Mar. 23, 2022, now Pat. No. 11,816,808, which is a continuation of application No. 17/195,153, filed on Mar. 8, 2021, now Pat. No. 11,315,338, which is a continuation of application No. 16/296,382, filed on Mar. 8, 2019, now abandoned.

(60) Provisional application No. 62/641,536, filed on Mar. 12, 2018.

(51) Int. Cl.
  *G06T 19/20*          (2011.01)
  *D05B 19/04*          (2006.01)
  *G06N 20/00*          (2019.01)

(52) U.S. Cl.
  CPC .............. *G06T 19/20* (2013.01); *D05B 19/04* (2013.01); *G06N 20/00* (2019.01); *D05D 2205/085* (2013.01); *D05D 2305/08* (2013.01);

*G06T 2200/24* (2013.01); *G06T 2210/16* (2013.01); *G06T 2219/2004* (2013.01)

(58) Field of Classification Search
  CPC ................ G06T 19/20; G06T 2200/24; G06T 2219/2004; G06T 2210/16; G06N 20/00; D05B 19/04; D05D 2305/08; D05D 2205/085

See application file for complete search history.

(56)                References Cited

U.S. PATENT DOCUMENTS

| | | | |
|---|---|---|---|
| 10,366,533 B2 * | 7/2019 | Sugita | G06T 19/20 |
| 2004/0049309 A1 * | 3/2004 | Gardner | A41H 1/00 |
| | | | 700/132 |
| 2013/0315475 A1 * | 11/2013 | Song | G06T 19/00 |
| | | | 382/154 |
| 2014/0176565 A1 * | 6/2014 | Adeyoola | G06F 16/5854 |
| | | | 345/473 |
| 2018/0218433 A1 * | 8/2018 | Penner | G06N 5/04 |
| 2019/0008225 A1 * | 1/2019 | Bajaj | G05B 19/4097 |
| 2019/0088033 A1 * | 3/2019 | Kuchibotla | G06T 11/00 |

* cited by examiner

*Primary Examiner* — James A Thompson

(57)                ABSTRACT

An application of a communication device for receiving a first set of inputs comprising at least one human attribute of at least a first user; receiving a second set of inputs comprising at least one clothing garment for the at least the first user from a plurality of clothing garments, each clothing garment comprising a set of clothing attributes; and generating at least one relationship between a human attribute and a clothing attribute based on the at least one human attribute of the at least the first user and the set of clothing attributes of the at least one clothing garment for the at least the first user.

20 Claims, 5 Drawing Sheets

100 — receiving human attributes by the application including anatomical measurement and physical attributes 101 — receiving photographs of a user by the application 102 — determining additional human attributes by the application based on the received human attributes and photographs 103 — generating a 3D model of the user by the application

FIG.2

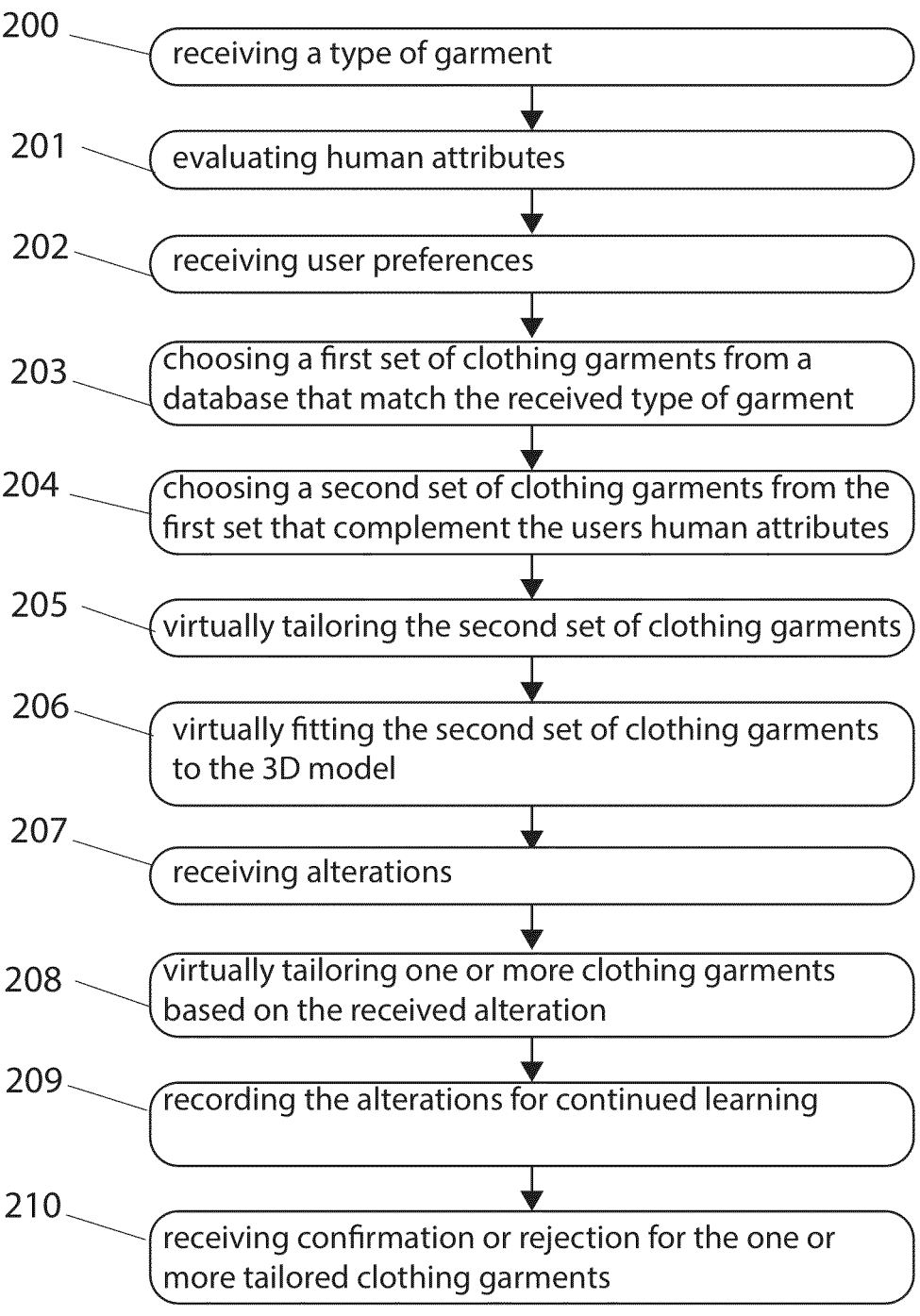

200 — receiving a type of garment

201 — evaluating human attributes

202 — receiving user preferences

203 — choosing a first set of clothing garments from a database that match the received type of garment 204 — choosing a second set of clothing garments from the first set that complement the users human attributes 205 — virtually tailoring the second set of clothing garments 206 — virtually fitting the second set of clothing garments to the 3D model 207 — receiving alterations 208 — virtually tailoring one or more clothing garments based on the received alteration 209 — recording the alterations for continued learning 210 — receiving confirmation or rejection for the one or more tailored clothing garments 300 — generating a cutting and sewing pattern by the application 301 — printing the patterns onto one or more fabrics 302 — cutting the one or more fabrics according to the cutting pattern 303 — sewing the one or more fabrics according to the sewing pattern 400 — generating cutting and sewing instructions by the application 401 — sending the cutting instructions to a cutting machine that cuts one or more fabrics according to the cutting instructions 402 — sending the sewing instructions to a sewing machine that sews the one or more fabrics according to the sewing instructions

VIRTUAL TAILOR

CROSS-REFERENCE TO RELATED APPLICATIONS

This application is a Continuation of U.S. Non-Provisional patent application Ser. No. 17/702,552, filed Mar. 23, 2022, which is a Continuation of U.S. Non-Provisional patent application Ser. No. 17/195,153, filed Mar. 8, 2021, which is a Continuation of U.S. Non-Provisional patent application Ser. No. 16/296,382, filed Mar. 8, 2019, which claims the benefit of Provisional Patent Application No. 62/641,536, filed Mar. 12, 2018, each of which is hereby incorporated by reference.

FIELD OF THE DISCLOSURE

The disclosure relates to customized garment designs.

BACKGROUND

The majority of clothing garments are sized based on average anatomical measurements of individuals. Therefore, finding clothing garments with a proper fit can be challenging for individuals with anatomical measurements that deviate from those of an average individual. Possible solutions include tailoring store-bought clothing or custom clothing for a particular individual. While these solutions are viable options, alterations and producing custom clothing are time consuming, labor intensive, and expensive.

A cost-effective method to quickly and easily produce clothing garments tailored for specific individuals based on their unique characteristics (e.g., height, skin tone, etc.) and their preferences (e.g., crop tops, longer skirts, tight fitting clothing, etc.) and to virtually display clothing garments on the individual is required.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a tangible, non-transitory, machine-readable medium storing instructions that when executed by a processor effectuate operations including: receiving, with an application executed by a communication device, a first set of inputs comprising at least one human attribute of at least a first user; receiving, with the application executed by the communication device, a second set of inputs comprising at least one clothing garment for the at least the first user from a plurality of clothing garments, each clothing garment comprising a set of clothing attributes; and generating, with the application executed by the communication device, at least one relationship between a human attribute and a clothing attribute based on the at least one human attribute of the at least the first user and the set of clothing attributes of the at least one clothing garment for the at least the first user; wherein the at least one relationship is generated using machine learning.

Included is a method implementing the above-described operations.

BRIEF DESCRIPTION OF THE DRAWINGS

FIG. 2 illustrates a flowchart describing a process for producing a customized clothing garment for a user, according to some embodiments.

DETAILED DESCRIPTION OF SOME EMBODIMENTS

Figure 1:
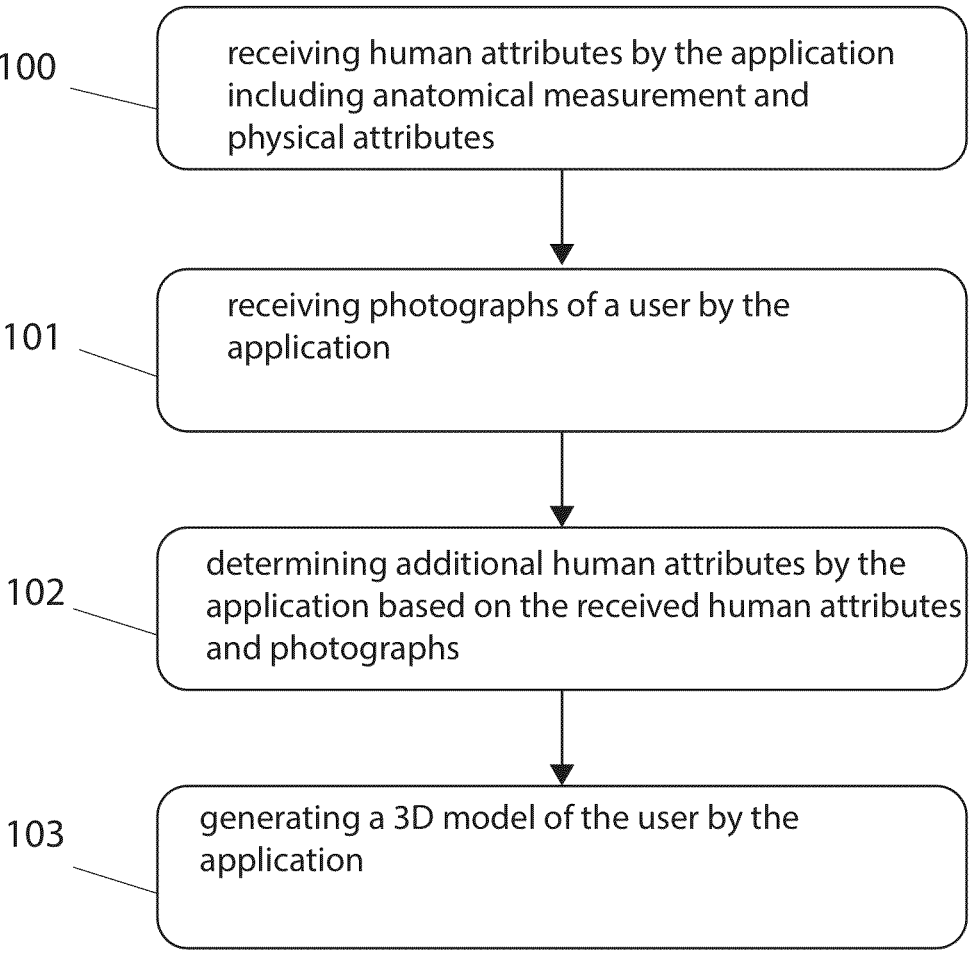
FIG. 1 illustrates a flowchart describing a process for generating a virtual 3D model of a user for the purpose of virtually fitting clothing garments, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a method for producing customized clothing garments for a user using an application executed by a communication device. Examples of a communication device include a mobile device, a tablet, a desktop computer, a laptop, or other devices on which an application can be executed. Examples of an application include a mobile application, a web application, a downloaded software, or other executable application. In some embodiments, the application executed by the communication device uses a combination of supervised and unsupervised machine learning techniques to identify which clothing attributes compliment different human attributes.

In some embodiments, the application is trained to identify which clothing attributes compliment different human attributes. In some embodiments, training includes using the application to select clothing garments with particular clothing attributes that compliment a human model with particular human attributes. Examples of human attributes include gender, age, height, weight, body proportions, body size, size of specific body parts, face shape, skin color, hair color, hair texture, eye color, etc. Examples of clothing attributes include cut, style, type of fabric, color, etc. In some embodiments, the process is repeated for human models with different human attributes and the application executed by the communication device learns which clothing attributes compliment human models with different human attributes (e.g., according to user input and feedback). In some embodiments, the application matches particular clothing garments with human models with particular human attributes based on learning which clothing attributes compliment human models with different human attributes.

In some embodiments, the application creates separate sets of data based on location, culture, seasons, and date. For example, clothing garments with clothing attributes that compliment a human model with particular human attributes are separated based on seasons such that only clothing garments with clothing attributes that compliment a human model with particular human attributes that are suitable for a particular season chosen are shown. In another example, clothing garments with clothing attributes that compliment a human model with particular human attributes are separated based on release year or year of popularity of the clothing garments such that clothing garments that are currently popular or that have fallen out of fashion over time can be filtered. In other embodiments, data is filtered based on other characteristics.

In some embodiments, the application is used to rate the clothing garments matched to human models with different human attributes for continued learning of which clothing attributes compliment human models with different human attributes. In some embodiments, the rating is provided by the same user that trained the application and in other embodiments, the rating is provided by a different user. In some embodiments, the application monitors cumulative ratings of clothing garments with particular clothing attributes matched to human models with different human attributes. In some embodiments, the application uses the ratings to adjust correlations between particular clothing attributes and human attributes. In some embodiments, the application assigns a weight to clothing attributes that represents the importance of the particular clothing attribute for human models with different human attributes. In some embodiments, the application adjusts the weight of clothing attributes based on the ratings. In some embodiments, the application modifies the clothing garments matched to human models with different human attributes based on the ratings. In some embodiments, the application suggests clothing garments for human models with different human attributes based on ratings. In some embodiments, the application modifies the clothing garments matched to human models with different human attributes when suggestions by the application are accepted by the user.

In some embodiments, the application applies slight modifications to the clothing attributes matched to human models with different human attributes for continued learning of which clothing attributes compliment human models with different human attributes. In some embodiments, the application suggests clothing garments for human models with different human attributes based on the slight modification. In some embodiments, the application modifies the clothing garments matched to human models with different human attributes when suggestions by the application are accepted by the user.

In some embodiments, the application monitors the clothing garments being matched to human models with different human attributes based on training of the application (as described above) provided by other users. In some embodiments, the application matches clothing garments to human models with different human attributes based on the training of the application (as described above) from multiple different users. In some embodiments, the application suggests clothing garments for human models with different human attributes based on training of the application (as described above) provided by other users. In some embodiments, the application modifies the clothing garments matched to human models with different human attributes when suggestions by the application are accepted by the user. In some embodiments, the application modifies the clothing garments matched to human models with different human attributes based on training of the application (as described above) provided by other users.

In some embodiments, the application monitors feedback (e.g., such as the feedback methods described above) and uses the feedback results to adjust clothing attributes matched to human models with different human attributes and the weight of different clothing attributes for a particular human model with particular human attributes.

In some embodiments, the application uses machine reinforcement learning techniques to learn which clothing garments to match to human models with different human attributes. In some embodiments, the application assigns a reward each time positive feedback from a user is received. In some embodiments, the application assigns a penalty each time negative feedback from a user is received. Examples of feedback include user ratings of clothing garments matched to a particular human model, user acceptance or rejection of clothing garments matched to a particular human model, clothing garments a user does or does not virtually fit to a particular human model, clothing garments viewed by a user, clothing garments ignored by a user, etc. In some embodiments, different types of feedback have different magnitudes of reward or penalty. In some embodiments, the application minimizes a cost function or maximizes a reward function to optimize the clothing garments matched to different human models.

In some embodiments, the application generates a 3D model of a user to virtually fit clothing garments to the 3D model of the user. In some embodiments, the application virtually fits clothing garments selected by a user using a touch screen of the communication device. In some embodiments, the application displays the virtual fitting of clothing garments on a screen of the communication device. In some embodiments, the application displays clothing garment with particular clothing attributes choices to the user that are selected by the application based on human attributes of the user. In some embodiments, the application virtually tailors clothing garments based on anatomical measurements of the user. In some embodiments, the application virtually fits the tailored clothing to the 3D model. In some embodiments, the application provides the custom measurements of clothing garments that may be, for example, provided to a tailor. In some embodiments, the application provides the custom measurements to the clothing garment provider such that they may produce the custom garment.

FIG. 1 illustrates a flowchart describing a process for generating a 3D model of a user according to some embodiments. In a first step 100, the application receives anatomical measurements (e.g., height, weight, waist size) and physical characteristics (e.g., hair color, skin tone, etc.) or otherwise human attributes of a user. In a second step 101, the application receives photographs of the user. In some embodiments, the photographs must meet specific requirements (e.g., front view of the body from head to toe, left side view of the body from head to toe, etc.). In a third step 102, the application generates additional human attributes of the user based on the received human attributes and the photographs of the user. For example, given the received anatomical data includes the height of the user and that the image provided is a front view of the body from head to toe, the width of the waist of the user can be calculated by the application. In some cases, the application infers additional physical attributes based on the photographs received. In a last step 103, the application generates a 3D model of the user based on the received and calculated anatomical data. In some embodiments, the application generates a 3D model of the user based on the received and calculated anatomical data and the received photographs of the user. In some embodiments, the application stitches the images together to create a 3D model of the user. In other embodiments, the application receives a video of the user and generates a 3D model of the user based on the video. In some embodiments, the application receives a 3D scan or 3D scan data of the user and generates a 3D model of the user based on the 3D scan data. In some embodiments, the application generates a 2D model of the user. In some embodiments, the application uses the 3D model to virtually fit clothing garments to the user.

FIG. 2 illustrates a flowchart describing a process for producing a customized clothing garment for a user, according to some embodiments. In a first step 200, the application receives a type of garment (e.g., a jacket, a dress, pants, etc.). In a next step 201, the application evaluates human attributes of the user. Human attributes include both anatomical measurements and physical characteristics. Examples of anatomical measurements include height, weight, arm length, waist circumference, thigh circumference, age, body proportions, size of specific body parts, etc. Examples of physical characteristics include gender, face shape, skin color, hair color, hair texture, eye color, and other characteristics. In some embodiments, human attributes are provided by a user or are inferred by the application based on data related to the user. In a next step 202, the application receives user preferences. Examples of user preferences include types of shirts, dress lengths, fabric types, collar styles, or other preferences. In a next step 203, the application searches a database of clothing garments and chooses a first set of clothing garments that match the type of garment received by the application and the user preferences. In a next step 204, the application searches the first set of clothing garments and chooses a second set of clothing garments that complement the human attributes of the user based on learning from user feedback (as described above). For example, based on user feedback the application learns over time that bust, hip, and waist ratios within a first range are complemented by two-button jackets and that bust, hip, and waist ratios within a second range are complemented by a three-button jacket. In a next step 205, the application virtually tailors the clothing garments within the second set based on the anatomical measurements of the user if required. For example, the application virtually shortens or lengthens a jacket sleeve. In a next step 206, the second set of clothing garments are virtually fitted on the 3D model of the user and displayed on a touch screen of a communication device on which the application is executed. In a next step 207, the application receives feedback for additional alterations for one or more clothing garments, such as altering the style, cut, color, length, fabric, or design details, like buttons or zippers if required. In a next step 208, the application virtually tailors the one or more clothing garments according to the user's feedback. In a next step 209, the application records the feedback for continued learning of which clothing attributes compliment human models with different human attributes. In a next step 210, the application receives a confirmation or rejection for the virtually fitted clothing garment. In some embodiments, the user accepts or rejects the clothing garment using the touch screen of the communication device. If the clothing garment is rejected, the process returns to step 207 until the application receives a confirmation for the clothing garment. In some embodiments, the accepted clothing garment is manufactured for the user.

Figure 3:
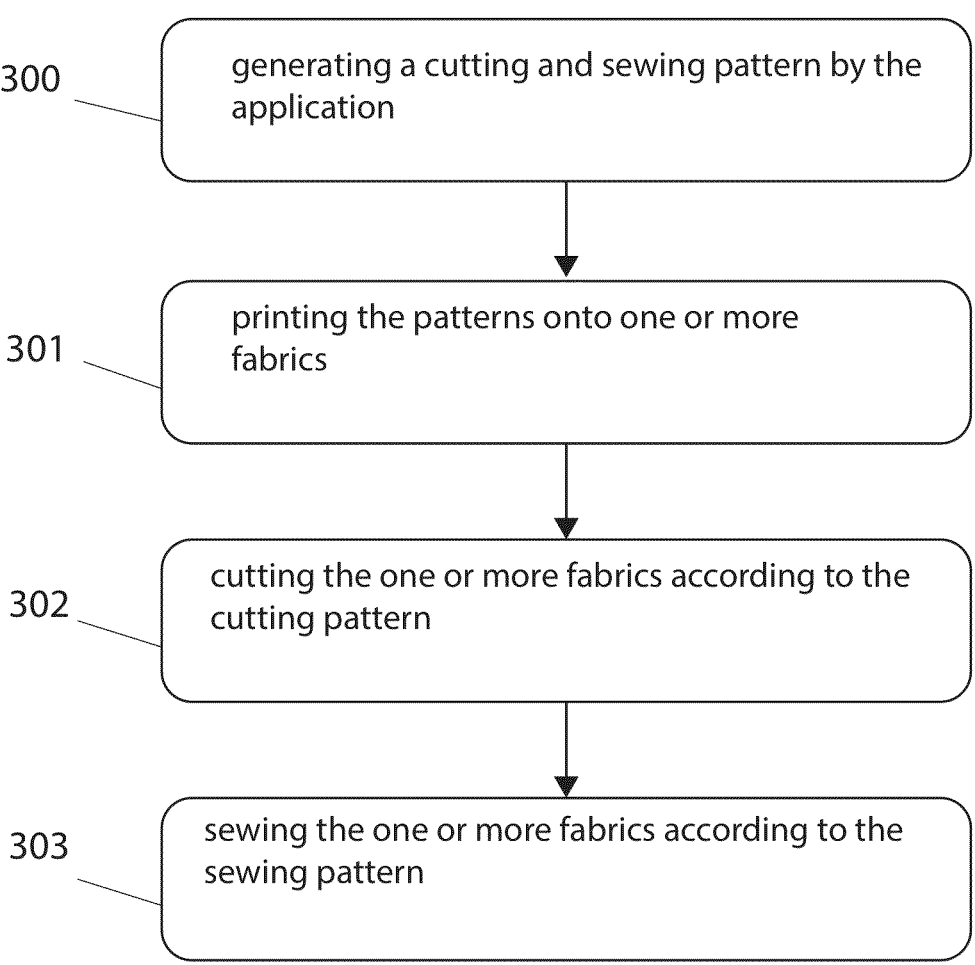
FIG. 3 illustrates a flowchart describing a manufacturing process of a clothing garment, according to some embodiments.

FIG. 3 illustrates a flowchart describing a manufacturing process of an accepted clothing garment, according to some embodiments. In a first step 300, a cutting and sewing pattern are generated by the application based on the accepted clothing garment. In a next step 301, sending the cutting and sewing pattern to a printer that prints the cutting and sewing pattern onto one or more fabrics. In some embodiments, the application generates the cutting and sewing pattern and provides them to the printer by wireless transmission or by uploading the patterns to the printer. In a next step 302, a cutting machine cuts the one or more fabrics according to the cutting pattern. In a next step 303, a sewing machine sews the one or more fabrics according to the sewing pattern. In some embodiments, the application instructs the cutting machine to cut the one or more fabrics and the sewing machine to sew the one or more fabrics according to cutting and sewing pattern, respectively.

Figure 4:
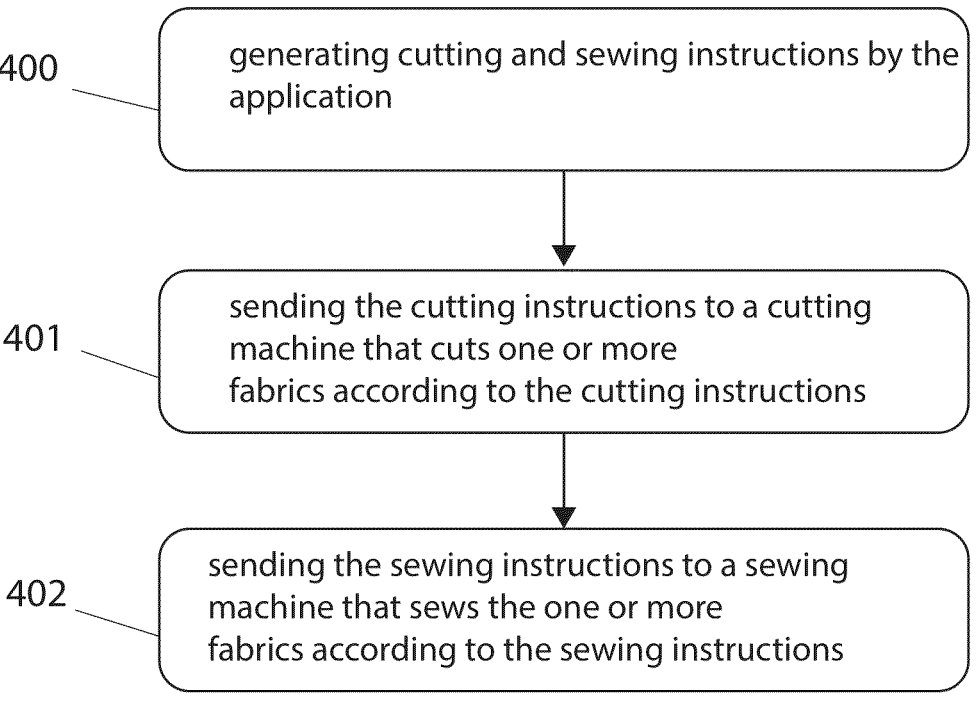
FIG. 4 illustrates a flowchart describing a manufacturing process of a clothing garment, according to some embodiments.

FIG. 4 illustrates a flowchart describing a manufacturing process of an accepted clothing garment, according to some embodiments. In a first step 400, the application generates a list of cutting and sewing instructions. In a next step 401, the application sends the cutting instructions to a cutting machine that uses the instructions to cut one or more fabrics. In some embodiments, the one or more fabrics are manually loaded into the cutting machine, and in other embodiments, the cutting machine includes a collection of fabrics and automatically loads the one or more fabric. In a next step 402, the application sends the sewing instructions to a sewing machine that uses the instructions to sew the cut one or more fabrics. In some embodiments, the cutting and sewing patterns are sent to an outside entity for manufacturing the clothing garment.

Figure 5:
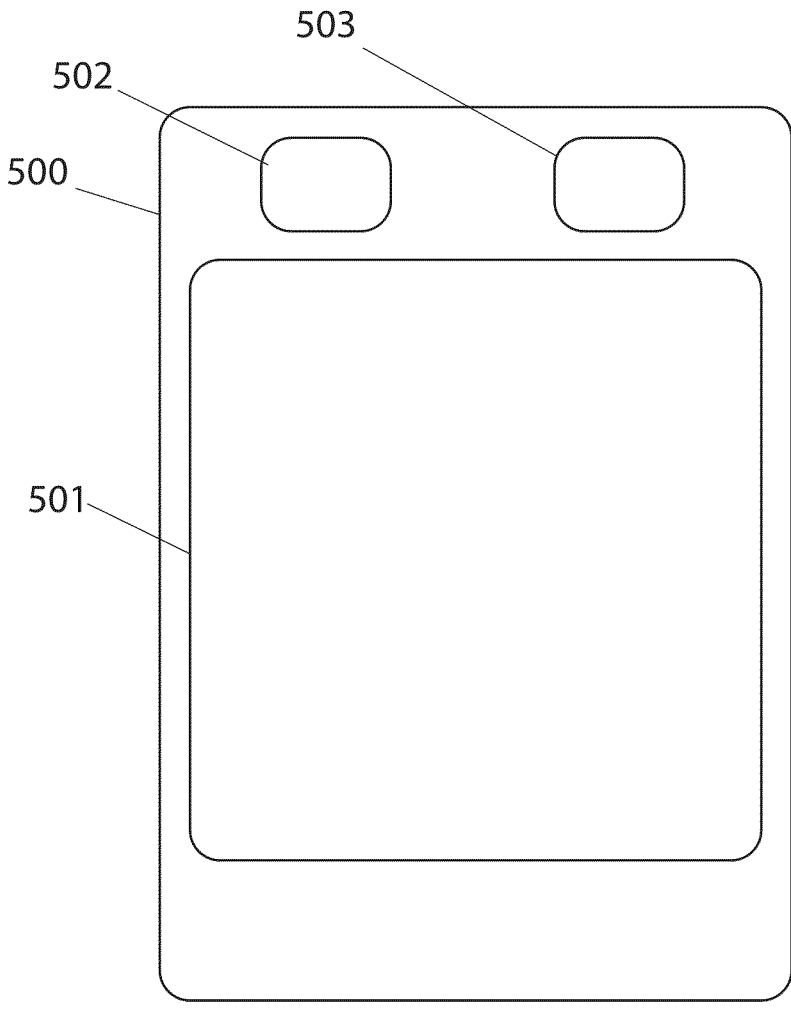
FIG. 5 illustrates an example of a communication device that may be used to execute the application described herein, according to some embodiments.

FIG. 5 illustrates an example of a communication device that may be used to execute the application described herein, according to some embodiments. Mobile device 500 with touchscreen 501 may be used to execute the application described herein. Instructions of the application may be stored on a memory 502 and the instructions may be executed by a processor 503.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A tangible, non-transitory, machine-readable medium storing instructions that, when executed by a processor, effectuate operations comprising:

receiving, with an application executed by a communication device, a first set of inputs comprising at least one human attribute of at least a first user, at least one photograph of a user, three-dimensional scan data of the user, one or more videos of the user, anatomical measurements of the user, physical characteristics of the user, and user preferences for different types of clothing garments;

receiving, with the application executed by the communication device, a second set of inputs comprising at least one of: at least one clothing garment for the at least the first user from a plurality of clothing garments, each clothing garment comprising a set of clothing attributes;

generating, with the application executed by the communication device, at least one relationship between a human attribute and a clothing attribute based on the at least one human attribute of the at least the first user and the set of clothing attributes of the at least one clothing garment for the at least the first user, wherein the at least one relationship is generated using machine learning; and generating, with the application executed by the communication device, a three-dimensional model of the user based on at least a portion of the user data.

2. The medium of claim 1, wherein the set of clothing attributes comprises at least a type of a clothing garment, a size of the clothing garment, a style of the clothing garment, a fabric of the clothing garment, and a color of the clothing garment; and the at least one human attribute of the at least the first user comprises at least information indicative of a body type or size.

3. The medium of claim 2, wherein the at least one human attribute of the at least the first user further comprises an age.

4. The medium of claim 2, wherein the at least one human attribute of the at least the first user further comprises at least one of skin complexion, a hair color and an eye color.

5. The medium of claim 1, wherein the operations further comprise:

generating, with the application executed by the communication device, a set of suggested clothing garments for the first user based on the at least one relationship; and presenting, with the application executed by the communication device, the set of suggested clothing garments on the user interface.

6. The medium of claim 5, wherein the operations further comprise:

generating, with the application executed by the communication device, a model of the user based on the at least one human attribute, wherein the set of suggested clothing garments are presented on the model of the user.

7. The medium of claim 5, wherein:

the operations further comprise:

receiving, with the application executed by the communication device, a third set of inputs comprising user preferences for different types of clothing garments; and the set of suggested clothing garments is generated further based on the user preferences for different types of clothing garments.

8. The medium of claim 1, wherein the operations further comprise:

receiving, with the application executed by the communication device, a fourth set of inputs comprising at least one human attribute of at least a second user;

generating, with the application executed by the communication device, a set of suggested clothing garments for the second user based on the at least one human attribute of the at least the second user and the at least one relationship; and presenting, with the application executed by the communication device, the set of suggested clothing garments on the user interface.

9. The medium of claim 1, wherein the operations further comprise:

generating, with the application executed by the communication device, a set of instructions for tailoring a selected clothing garment based on the at least one human attribute; and presenting, with the application executed by the communication device, the set of instructions for tailoring the selected clothing garment.

10. The medium of claim 9, wherein the operations further comprise:

presenting, with the application executed by the communication device, the selected clothing garment virtually tailored on the user interface.

11. The medium of claim 9, wherein the set of instructions for tailoring the selected clothing garment comprise at least one of: cutting instructions and sewing instructions.

12. The medium of claim 11, wherein the operations further comprise:

sending, with the application executed by the communication device, at least one of: the cutting instructions to a cutting machine and the sewing instructions to a sewing machine;

wherein the selected clothing garment is at least partially manufactured by at least one of:

the cutting machine and sewing machine based on the set of instructions for tailoring the selected clothing garment.

13. The medium of claim 1, wherein generating the at least one relationship further comprises:

receiving, with the application executed by the communication device, a fifth set of inputs comprising a rating for a clothing garment presented on the user interface; and adjusting, with the application executed by the communication device, the at least one relationship based on the rating received.

14. A method comprising:

receiving, with an application executed by a communication device, a first set of inputs comprising at least one human attribute of at least a first user;

receiving, with the application executed by the communication device, a second set of inputs comprising at least one of: at least on clothing garment for the at least the first user from a plurality of clothing garments, each clothing garment comprising a set of clothing attributes, at least one photograph of a user, three-dimensional scan data of the user, one or more videos of the user, anatomical measurements of the user, physical characteristics of the user, and user preferences for different types of clothing garments;

generating, with the application executed by the communication device, at least one relationship between a human attribute and a clothing attribute based on the at least one human attribute of the at least the first user and the set of clothing attributes of the at least one clothing garment for the at least the first user, wherein the at least one relationship is generated using machine learning; and generating, with the application executed by the communication device, a three-dimensional model of the user based on at least a portion of the user data.

15. The method of claim 14, wherein:

the set of clothing attributes comprises at least a type of a clothing garment, a size of the clothing garment, a style of the clothing garment, a fabric of the clothing garment, and a color of the clothing garment; and the at least one human attribute of the at least the first user comprises at least information indicative of a body type or size.

16. The method of claim 15, wherein the at least one human attribute of the at least the first user further comprises at least one of: an age, skin complexion, a hair color, and an eye color.

17. The method of claim 14, further comprising:

generating, with the application executed by the communication device, a set of suggested clothing garments for the first user based on the at least one relationship; and presenting, with the application executed by the communication device, the set of suggested clothing garments on the user interface.

18. The method of claim 17, further comprising:

receiving, with the application executed by the communication device, a third set of inputs comprising user preferences for different types of clothing garments;

wherein the set of suggested clothing garments is generated further based on the user preferences for different types of clothing garments.

19. The method of claim 14, further comprising:

receiving, with the application executed by the communication device, a fourth set of inputs comprising at least one human attribute of at least a second user;

generating, with the application executed by the communication device, a set of suggested clothing garments for the second user based on the at least one human attribute of the at least the second user and the at least one relationship; and presenting, with the application executed by the communication device, the set of suggested clothing garments on the user interface.

20. The method of claim 14, wherein generating the at least one relationship further comprises:

receiving, with the application executed by the communication device, a fifth set of inputs comprising a rating for a clothing garment presented on the user interface; and adjusting, with the application executed by the communication device, the at least one relationship based on the rating received.

* * * * *